United States Patent [19]

Ota

[11] Patent Number: 4,647,826
[45] Date of Patent: Mar. 3, 1987

[54] POSITION LOOP GAIN CONTROL METHOD

[75] Inventor: Naoto Ota, Tokyo, Japan

[73] Assignee: Fanuc Ltd., Minamitsuru, Japan

[21] Appl. No.: 705,432

[22] PCT Filed: Jun. 12, 1984

[86] PCT No.: PCT/JP84/00302
§ 371 Date: Feb. 8, 1985
§ 102(e) Date: Feb. 8, 1985

[87] PCT Pub. No.: WO84/04981
PCT Pub. Date: Dec. 20, 1984

[30] Foreign Application Priority Data

Jun. 13, 1983 [JP] Japan .................. 58-105236

[51] Int. Cl.[4] .......................................... G05B 13/00
[52] U.S. Cl. ...................... 318/561; 318/467; 318/603
[58] Field of Search ............. 318/561, 467, 603

[56] References Cited

U.S. PATENT DOCUMENTS 4,347,471  8/1982  Kohzai et al. .................. 318/616

Primary Examiner—William M. Shoop, Jr.
Assistant Examiner—Saul M. Bergmann
Attorney, Agent, or Firm—Staas & Halsey

[57] ABSTRACT

A position loop gain control method for deciding the gain of a digital-to-analog converter (301), which constitutes an orientation controller, in such a manner that the gain of a position loop assumes a set value $K_p$, the position loop being part of a position control feedback system comprising a velocity control circuit (101c), a spindle motor (102), a position coder (104), an orientation controller (101e) and a changeover switch (101b), which method has steps of rotating the spindle motor at a predetermined velocity $N_b$, measuring a deceleration time $T_f$ taken to achieve deceleration from the velocity $N_b$ down to a velocity of zero, and deciding a gain $K_{DA}$ of the digital-to-analog converter by using the set value $K_p$, predetermined velocity Nb, deceleration time $T_f$, and a distance D from a changeover point, at which there is a transition from velocity control to position control at a time when spindle orientation control is applied, to a prescribed orientation.

4 Claims, 5 Drawing Figures

1

POSITION LOOP GAIN CONTROL METHOD

BACKGROUND OF THE INVENTION

This invention relates to a position loop gain control method for deciding the gain of a digital-to-analog converter, which constitutes a position loop, in such a manner that the gain of the position loop assumes a set value, the position loop being part of a spindle orientation apparatus for stopping a spindle at a prescribed orientation.

The capability of stopping a spindle at a prescribed orientation is required in a machine tool. As an example, in a machining center with ATC (automatic tool-change function), it is necessary to stop a spindle at a prescribed orientation in order to change a tool mounted on the spindle. To cut a screw hole, bore, keyway or the like into a workpiece mounted on a spindle in a turning center, it is necessary that the workpiece, namely the spindle, be brought to rest at a prescribed orientation.

To this end, various spindle orientation control apparatus have been proposed. FIG. 1 is a block diagram of a spindle orientation circuit for controlling a turning center, and FIG. 2 is an operation time chart of the same. When a turning operation is performed, a digital command velocity $V_c$ produced by an NC unit, not shown, enters a velocity command circuit 101a incorporating a DA converter and the like, where $V_c$ is converted into an analog command velocity CVA. This is then applied to a spindle motor 102 via a changeover switch 101b and a velocity control circuit 101c, thereby rotating the spindle motor. The actual velocity of the spindle motor 102 is sensed by a tachometer 103, emerging from the latter as a velocity feedback signal AVA, which is applied to the velocity control circuit 101c. The latter rotates the spindle motor 102 at the command velocity $V_c$.

When the stage is reached at which a spindle 105 is to be brought to a stop at a prescribed orientation at the conclusion of turning machining, the NC unit, not shown, issues an orientation command ORCM and the command velocity $V_c$ becomes an initial orientation velocity ($V_{ORi}$). As a result, the rotational velocity of the spindle motor 102 is decelerated down to the initial orientation velocity $V_{ORi}$. When the output of an arithmetic circuit ARM, described below, attains a predetermined value after the initial orientation velocity is reached, a changeover circuit 101d changes over a movable contact of the changeover switch 101b to a contact B. An orientation controller 101e is adapted to produce a position deviation voltage RPD (analog voltage) which conforms to a deviation between a prescribed spindle position and the current spindle position. When the changeover switch 101b is changed over to the contact B, the velocity control circuit 101c produces a difference voltage between the position deviation voltage RPD and the actual velocity AVA and performs servo position control in such a manner that the position deviation voltage takes on a value of zero. When the position deviation voltage RPD reaches zero, a monitoring circuit 101f produces a spindle orientation end signal ORDEN. Thus, a position control feedback loop is constructed by the velocity control circuit 101c, spindle motor 102, position coder 104, orientation controller 101e and changeover switch 101b, with the spindle 105 being positioned at the prescribed orientation thereby. In the orientation controller 101e, a counter CNT is set to a numerical value N when the position coder 104 generates a one-revolution signal RP. Then, each time an A-phase pulse PA is generated, the status of the counter is decremented. It should be noted that N is a number, e.g., 4096, of A-phase pulses generated by the position coder 104 during one revolution of the spindle. The arithmetic circuit ARM executes the addition of a numerical value $N_s$ from the counter CNT, and a numerical value $N_c$ corresponding to a commanded spindle stopping position. DAC denotes a digital-to-analog converter (referred to as a DA converter) for generating the position deviation voltage RPD, which corresponds to a numerical value $N_r$ produced by the arithmetic circuit. The DA converter DAC is adapted to produce an output of zero volts when $N_r$ is 2048, of $-V_b$ (volts) when $N_r$ is 0, and an output of $+V_b$ (volts) when $N_r$ is 4096. In a case where it is desired to stop the spindle at an intermediate position (180° position) where the number of A-phase pulses produced will be 2048 starting from the position at which the one-revolution pulse RP is generated, the operation $N_c=0$ is performed and the orientation controller 101e produces the position deviation voltage RPD, which is a sawtooth signal (see the solid line in FIG. 2) that crosses the zero level at a position 180° from the position at which the one-revolution signal is generated. Further, the operation $N_c=-1048$ is performed if is desired to stop the spindle at a position 90° from the position at which the one-revolution signal is generated, the operation $N_c=1048$ is performed when it is desired to stop the spindle at a position 270° from the position at which the one-revolution signal is generated, and, in each case, the position deviation signal RPD is produced, with the signal being as illustrated by the one-dot chain line line in FIG. 2 in the former case and by the dashed line in the latter.

Assume that the spindle is desired to be stopped at the position 180° from the position at which the one-revolution signal is generated. If the spindle 105 is being rotated at the initial orientation velocity $V_{ORi}$, then, when the output of the arithmetic circuit ARM becomes 4096, the changeover circuit 101d senses the fact and changes over the movable contact of the changeover switch 101b to the contact B. When the numerical value applied thereto is 4096, the DA converter DAC produces the voltage $V_b$, which is equivalent to the initial orientation velocity $V_{ORi}$. Therefore, when the switch 101b is changed over (i.e., when there is a changeover from velocity control to position control), the input voltage of the velocity control circuit 101c makes a smooth transition, after which the spindle 105 is subjected to position control and stopped at the commanded prescribed orientation.

If the position loop gain in the spindle orientation circuit does not possess an appropriate value, overshoot or hunting (due to excessively high gain) occurs at positioning, and servo rigidity when the spindle is at rest at the prescribed orientation is weakened (due to low gain), so that the spindle is easily moved by an external force.

Position loop gain is dependent upon load inertia seen from the motor, and load inertia differs from machine to machine and from one spindle speed reduction stage to another even in one and the same machine. In the conventional spindle orientation circuit, therefore, position loop gain is adjusted by manually controlling the gain of an amplifier in the position loop as well as the characteristic of the DA converter whenever the machine is changed and whenever the spindle speed reduction stage is changed.

However, the above-described conventional method of adjustment involves a troublesome adjustment operation since the position loop must be adjusted manually whenever the machine is changed and whenever the spindle speed reduction stage is changed.

SUMMARY OF THE INVENTION

An object of the present invention is to provide a position loop gain control method whereby position loop gain can be adjusted to a set value through a simple operation.

Another object of the present invention is to provide a position loop gain control method whereby position loop gain can be adjusted to a set value automatically merely by pressing a gain adjustment request button.

The present invention provides a position loop gain control method for deciding the gain of a digital-to-analog converter, which constitutes a position loop, in such a manner that the gain of the position loop assumes a set value $K_p$, the position loop being part of a spindle orientation apparatus for stopping a spindle at a prescribed orientation. According to the position loop gain control method, a motor is rotated at a base velocity $N_b$, then a deceleration time $T_f$ taken to achieve deceleration from the velocity $N_b$ down to a velocity of zero is measured, and a gain $K_{DA}$ of the digital-to-analog converter is decided by using the set value $K_p$, the base velocity $N_b$, the deceleration time $T_f$, and a distance D from a changeover orientation, at which there is a transition from velocity control to position control at spindle orientation, to the prescribed orientation.

DESCRIPTION OF THE PREFERRED EMBODIMENT

Figure 1:
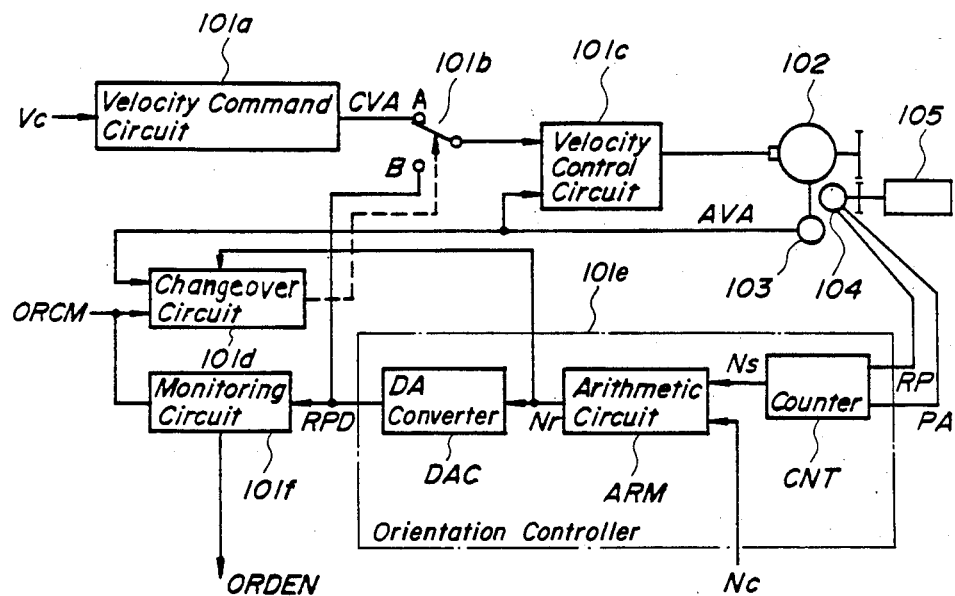
FIG. 1 is a block diagram of a conventional orientation circuit.
Figure 2:
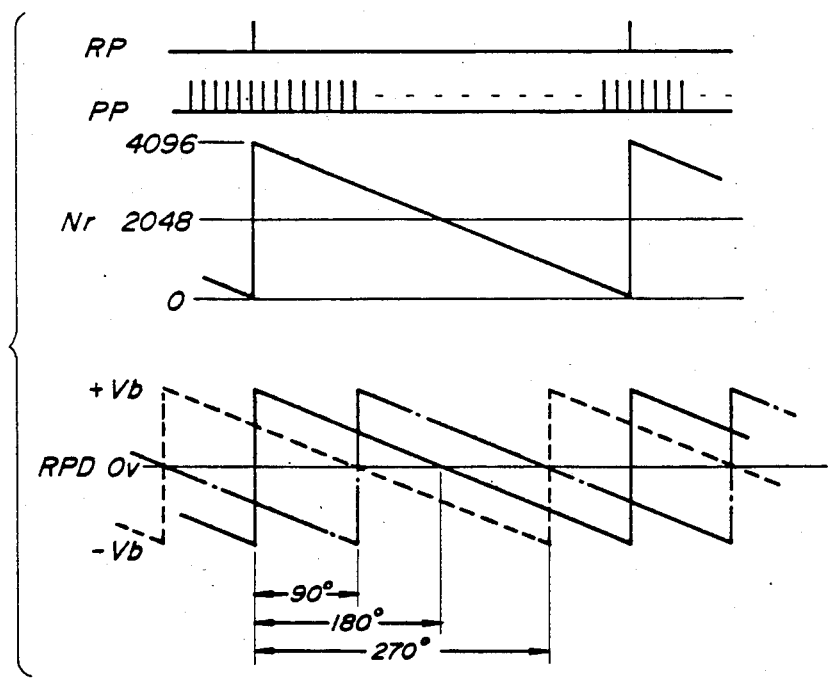
FIG. 2 is a diagram of various waveforms associated with FIG. 1.
Figure 3:
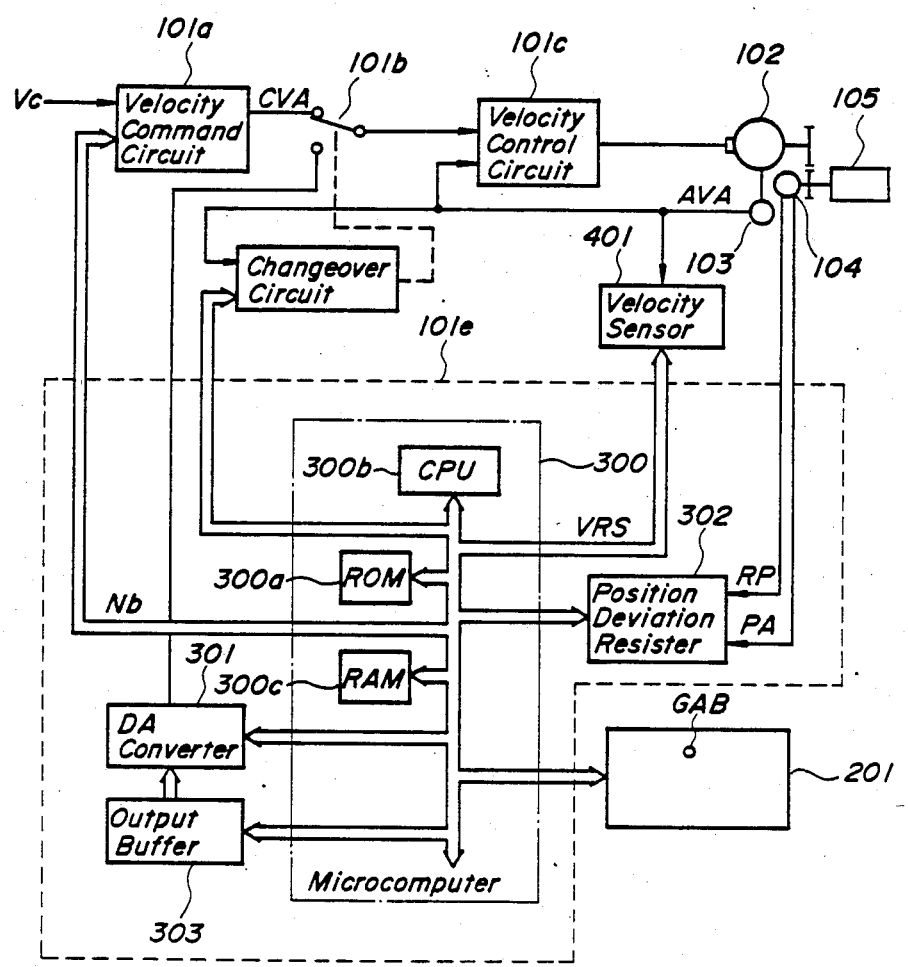
FIG. 3 is a block diagram of a spindle orientation apparatus according to the present invention.

FIG. 3 is a block diagram of a spindle orientation apparatus according to the present invention and shows an orientation control loop in detail. Portions similar to those shown in FIG. 1 are denoted by like reference characters. The arrangement of FIG. 3 differs from that of FIG. 1 in the following respects:

(1) the orientation controller 101e includes a microcomputer 300;

(2) a ROM 300a in the microcomputer 300 stores a program for position loop gain control; and (3) an operator's panel 201 is provided and it is arranged for a position loop gain adjustment request signal to be applied from the operator's panel 201 to the orientation controller 101e.

Figure 4:
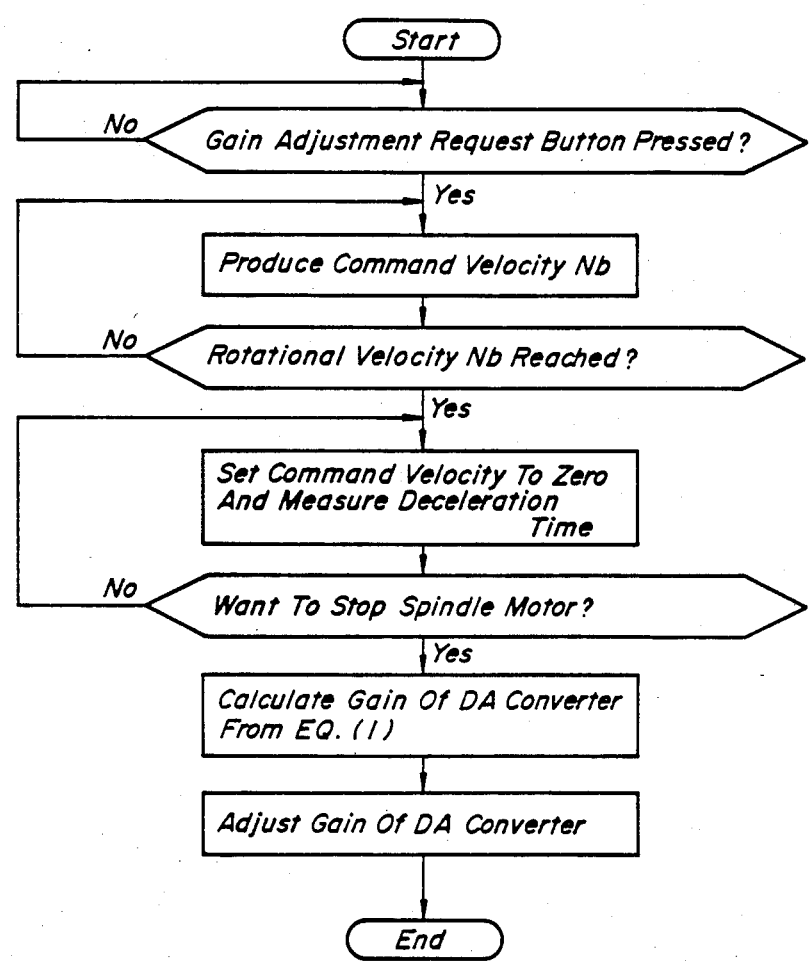
FIG. 4 is a process flowchart illustrating a position loop gain adjustment according to the present invention.

The operation of the arrangement of FIG. 3 will now be described with reference to the process flowchart of FIG. 4 illustrating a position loop gain adjustment.

(a) When the spindle motor 102 is at rest, a gain adjustment request button GAB on the operator's panel 201 is pressed. Depression of the gain adjustment button is immediately recognized by the microcomputer 300 of the orientation controller 101e.

(b) As a result, a processor 300b, under the control of a control program, applies a base velocity $N_b$ (1500 rpm) as a command velocity to the velocity command circuit 101a. The base velocity $N_b$ enters the spindle motor 102 via the changeover switch 101b and velocity control circuit 101c, so that the spindle motor is rotated at the base velocity.

(c) When the rotational velocity of the spindle motor 102 arrives at the base velocity, a velocity sensor 401 generates a velocity arrival signal VRS which is read by the processor 300b. The processor 300b responds by applying a velocity command of magnitude zero to the velocity command circuit 101a.

Figure 5:
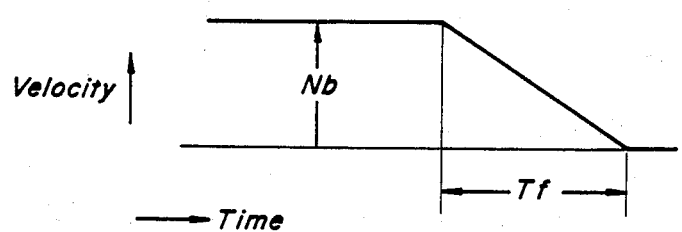
FIG. 5 is a deceleration characteristic for describing the present invention.

(d) In consequence, the rotational velocity of the spindle motor 102 starts to be reduced from the base velocity $N_b$ toward zero, as shown in FIG. 5. The processor 300b clocks, by means of an internal software timer, elapsed time since generation of the zero command velocity. When the rotational velocity of the spindle motor 102 becomes zero, the zero rotational velocity is sensed by the velocity sensor 401, which communicates the fact to the processor 300b. The latter halts the clocking of elapsed time, which is now stored as a deceleration time $T_f$ in a RAM 300c.

(e) Thereafter, the processor 300b calculates gain $K_{DA}$ of a variable gain DA converter 301 by performing the operation given by the following equation:

$$K_{DA} = K \frac{1}{K_p} \cdot \frac{N_b}{T_f} \cdot \frac{1}{D} \quad (1)$$

and applies the result of the calculation to the DA converter 301. When the gain of the DA converter 301 is adjusted on the basis of the gain $K_{DA}$, this ends the process for automatic adjustment of the position loop gain. It should be noted that the DA converter 301 is composed of a Burr-Brown DAC80 and an Intersil AD7523JN. In Eq. (1), the following definitions hold:

$K_{DA}$ . . . Gain of DA converter 301
$K_p$ . . . Desired position loop gain
$N_b$ . . . Base velocity
$T_f$ . . . Deceleration time
D . . . Distance to prescribed orientation position from point at which changeover is made from velocity control to position control at time of spindle orientation control, which distance is represented by, e.g., number of pulses generated by position coder 104 during rotation of spindle from said point to prescribed orientation
K . . . (rated rotational command voltage of motor)/(rated rpm of motor)

The reason for finding the gain of the DA converter 301 from Eq. (1) will now be described.

The maximum slope controllable by the spindle motor 102 at the time of the currently prevailing load inertia is $N_b/T_f$, as is evident from FIG. 5. Accordingly, the gain of the DA converter should be so decided as to attain this slope when spindle orientation control is applied.

The initial orientation velocity when there is a transition from velocity control to position control at application of spindle orientation control is $V_{ORi}$. Therefore, assuming that the predetermined value of position loop gain is $K_p$, the following will hold:

$$K_p \cdot V_{ORi} = \frac{N_b}{T_f} \qquad (2)$$

If we let $T_p = 1/K_p$, then the following will hold:

$$\frac{V_{ORi}}{T_p} = \frac{N_b}{T_f} \qquad (2)'$$

On the other hand, when the transition is made from velocity control to position control at application of spindle orientation control, the value of the voltage produced by the DA converter 301 at such time is proportional to the initial orientation velocity $V_{ORi}$. Therefore, letting $K_{DA}$ be the gain of the DA converter 301 and D the difference (distance) between the prescribed spindle orientation and the current spindle orientation at the time of the abovementioned transition, we will have the following:

$$K_{DA} \cdot D = K \cdot V_{ORi}$$

Eliminating $V_{ORi}$ from Eqs. (2), (3) gives us:

$$K_{DA} = K \cdot \frac{1}{K_p} \cdot \frac{N_b}{T_f} \cdot \frac{1}{D}$$

where K is the value defined above.

When the gain adjustment of the DA converter 301 is concluded through the foregoing operation, spindle orientation control can be performed under optimum conditions from then onward. That is, when the spindle orientation command ORCM is issued by the operator's panel 201 or by the NC unit (not shown) and, moreover, when a commanded stopping position $N_c$ is issued, the processor 300b performs spindle orientation control which is exactly the same as that performed in the prior-art example of FIG. 1. It should be noted that a position deviation register 302 in FIG. 3 corresponds to the counter CNT of FIG. 1, the microcomputer 300 corresponds to the arithmetic circuit ARM, and the DA converter 301 corresponds to the DA converter DAC. However, the results of processing performed by the processor 300b are temporarily stored in a single-stage output buffer 303 and are then applied to the DA converter 301.

According to the position loop gain control method of the present invention as described above, the arrangement is such that the motor is rotated at the base velocity $N_b$, then the deceleration time $T_f$ taken to achieve deceleration from the velocity $N_b$ down to a velocity of zero is measured, and the gain $K_{DA}$ of the digital-to-analog converter is decided by using the desired position loop gain $K_p$, the predetermined velocity $N_b$, the deceleration time $T_f$, and the distance D from a changeover orientation, at which there is a transition from velocity control to position control at the time spindle orientation is applied, to the prescribed orientation. This enables the gain of the DA converter to be simply and automatically in such a manner that the position loop gain assumes a set value. According to the present invention, the fact that a desired loop gain can be obtained eliminates the occurrence of overshoot and hunting and makes it possible to achieve a suitable servo rigidity when the spindle is at rest.

The present invention is well-suited for application to the adjustment of position loop gain in a spindle orientation apparatus for stopping a spindle at a prescribed orientation.

I claim:

1. A position loop gain control method for determining the gain of a digital-to-analog converter, which constitutes a position loop, in such a manner that the gain of the position loop assumes a set value $K_p$, the position loop being part of a spindle orientation apparatus for performing spindle orientation control to stop a spindle at a prescribed orientation, characterized by having steps of rotating a motor at a predetermined velocity $N_b$, measuring a deceleration time $T_f$ taken to achieve deceleration from said velocity $N_b$ down to a velocity of zero, and determining a gain $K_{DA}$ of said digital-to-analog converter by using said set value $K_p$, predetermined velocity Nb, deceleration time $T_f$, and distance D from a changeover point, at which there is a transition from velocity control to position control at a time when the spindle orientation control is applied, to a prescribed orientation.

2. A position loop gain control method according to claim 1, characterized in that the gain $K_{DA}$ of said digital-to-analog converter is calculated according to the following equation:

$$K_{DA} = K \frac{1}{K_p} \cdot \frac{N_b}{T_f} \cdot \frac{1}{D}$$

where D represents a number of pulses generated by a pulse generator during rotation of the spindle from said changeover point to said prescribed orientation, in a case where the pulse generator is attached to the spindle, and K represents a constant having a value determined by a rated rotational command voltage of the motor and a rated rpm of the motor.

3. A position loop gain control method according to claim 2, characterized in that said DA converter generates an analog voltage which corresponds to a difference between the prescribed orientation of the spindle and a current spindle orientation.

4. A position loop gain control method according to claim 2, characterized in that means for generating a gain adjustment request signal are provided, and a command velocity is set to $N_b$ in response to said gain adjustment request signal to rotate the spindle at said velocity $N_b$.

* * * * *